US009359750B1

(12) United States Patent
Perez

(10) Patent No.: US 9,359,750 B1
(45) Date of Patent: Jun. 7, 2016

(54) METHOD AND APPARATUS FOR CLEANING AND CLEARING P-TRAP SYSTEMS

(71) Applicant: Thomas Perez, Houston, TX (US)

(72) Inventor: Thomas Perez, Houston, TX (US)

( * ) Notice: Subject to any disclaimer, the term of this patent is extended or adjusted under 35 U.S.C. 154(b) by 0 days.

(21) Appl. No.: 14/804,925

(22) Filed: Jul. 21, 2015

Related U.S. Application Data

(60) Provisional application No. 62/078,500, filed on Nov. 12, 2014.

(51) Int. Cl.
*F16L 43/00* (2006.01)
*E03C 1/30* (2006.01)
*F15D 1/02* (2006.01)

(52) U.S. Cl.
CPC .... *E03C 1/30* (2013.01); *F15D 1/02* (2013.01)

(58) Field of Classification Search
CPC ...... F16L 45/00; F16L 41/021; B08B 9/0321; B08B 9/0328; F28F 17/005; F24F 13/222; C02F 1/688
USPC .......................... 137/247.11, 247.13, 247.41
See application file for complete search history.

(56) References Cited

U.S. PATENT DOCUMENTS 5,085,244 A * 2/1992 Funk .......................... 137/240
5,722,458 A 3/1998 Potter
6,442,955 B1 9/2002 Oakner et al.
6,701,740 B1 * 3/2004 Hernandez-Zelaya ......... 62/291
6,708,717 B1 3/2004 Coogle
6,745,580 B1 * 6/2004 Brown ............................ 62/129
8,075,769 B1 * 12/2011 Gleason et al. ............... 210/206
8,156,956 B1 * 4/2012 Coogle ......................... 137/240
2005/0198989 A1 * 9/2005 Cantalino ....................... 62/303
2006/0096307 A1 * 5/2006 Coogle ........................... 62/272
2006/0156467 A1 * 7/2006 Mellon ............................. 4/679
2012/0000233 A1 * 1/2012 Eads ............................... 62/303
2014/0338758 A1 11/2014 Oakner et al.

* cited by examiner

*Primary Examiner* — Jessica Cahill
*Assistant Examiner* — Angelisa L Hicks
(74) *Attorney, Agent, or Firm* — Keeling Patents & Trademarks, LLC; Kenneth A. Keeling; Melissa M. Martinez

(57) ABSTRACT

Embodiments of an apparatus for draining liquid generally include a liquid inlet, a p-trap, an additive reservoir, a fluid outlet, a float switch, a valve, and a fitting, wherein the liquid inlet allows for introduction of liquid, the p-trap allows for maintenance of a liquid level whereby contact is provided between the liquid and an additive contained in the additive reservoir, the fluid outlet is configured to maintain the liquid level above an additive reservoir bottom interior surface, the float switch provides indication of high liquid level, the valve allows for blockage of fluid flow between the p-trap and the liquid inlet, and the fitting allows for introduction of high-pressure fluid into the apparatus. Embodiments of a method for clearing a liquid draining apparatus generally include ceasing flow of liquid there into, operating a valve to substantially prevent reverse flow of liquid therefrom, and providing high-pressure fluid into the apparatus.

20 Claims, 4 Drawing Sheets

METHOD AND APPARATUS FOR CLEANING AND CLEARING P-TRAP SYSTEMS

CROSS-REFERENCE TO RELATED APPLICATIONS

This application claims the benefit of U.S. Provisional Application No. 62/078,500 filed on Nov. 12, 2014, which application is incorporated herein by reference as if reproduced in full below.

STATEMENT REGARDING FEDERALLY SPONSORED RESEARCH OR DEVELOPMENT

Not Applicable.

BACKGROUND OF THE INVENTION

1. Field of the Invention

The present invention relates generally to p-trap drains and a system and method for maintaining them. More particularly, the present invention relates to an apparatus and method for preventing accumulation of debris in p-trap drain systems and for flushing debris from p-trap drain systems.

2. Description of the Related Art

A p-trap, also known as a sink trap, is used in many water piping systems to prevent reverse flow of gases. A p-trap includes a u-bend and a 90 degree bend on the outlet, or downstream side of the u-bend. Liquid that flows through the piping system to the u-bend collects in the bottom thereof and overflows therefrom through the 90 degree bend in the piping. Because of the configuration of the p-trap, a quantity of liquid remains in the bottom of the u-bend even when liquid is not flowing to the p-trap. This residual level of liquid in the u-bend prevents gases present in the downstream piping from entering the inlet, or upstream piping side of the u-bend.

One embodiment of a p-trap system may be employed in an air conditioning unit. In such an embodiment, liquid (in this case water) is condensed from the cooled air produced by the air conditioning unit. In a typical air conditioning system, the condensed water is collected in a "pan" there beneath, that is often merely a shallow vessel that comprises a fairly durable and corrosion resistant material such as aluminum. The pan typically includes a drainpipe that allows the condensed water to be drained from the air conditioning system. This drainpipe may include a p-trap to prevent any gases from "backing up" into the pan, and possibly therefore into the air conditioning system.

Due to the nature of the condensed water in an air conditioning system, contaminants, which may comprise living organisms, such as algae, fungus, bacteria, etc., may be present in the condensed water and therefore in the pan and drainpipe. Growth and accumulation of these living organisms, i.e., "slime," as well as accumulation of other impurities that may be present, can produce partial or total blockage of the drainpipe. When this blockage occurs, water may build up in, and actually overflow, the pan. If the pan overflows, damage to surrounding and underlying property may occur. Although some pans are equipped with secondary drain systems, such secondary systems are typically not designed to accommodate the flow of water normally produced by the air conditioning system.

One current method of preventing or minimizing growth of these living organisms in the drainpipe includes the use of sodium hypochlorite, commonly referred to as "chlorine," that can be effective as a biocide in controlling the buildup of slime. In a typical employment of chlorine in an air conditioning system, chlorine tablets are placed in the pan by a plumber or other professional person familiar with such systems to prevent or limit growth of slime in the pan and the drainpipe. A limitation of this method is that accessing the inside of the pan is often a laborious and time consuming endeavor. With many air conditioning systems, disassembly of one or more system components is required to obtain sufficient access to the pan to allow for placement therein of the chlorine tablets.

Although the use of chlorine may reduce or delay the accumulation of slime in the drainpipe, such accumulation may still result in blockage of the drainpipe. When such blockage occurs, it is often necessary to dislodge or "flush" the blockage material from the drainpipe. Accordingly, many drainpipes are equipped with a piping component that allows for the introduction of a flushing medium, such as a liquid or a gas, at a pressure and/or flow rate designed to dislodge the slime and clear the p-trap. Mechanisms for flushing the p-trap may be fluidly coupled to the drainpipe to perform this flushing. One issue with such flushing mechanisms, however, is that safe, fixed attachment to the appropriate drainpipe component is not easily accomplished. In addition, insulation shortcomings may create undesired condensation issues.

BRIEF SUMMARY OF THE INVENTION

An exemplary embodiment of the present invention comprises a drainpipe apparatus that comprises an additive delivery mechanism and a clearing mechanism. Therein, an additive may be introduced to the drainpipe apparatus without having to access the interior of the pan. Additionally, embodiments of the invention may comprise a mechanism for safely and effectively clearing the drainpipe. An exemplary embodiment of the present invention comprises a method of draining an air conditioning system utilizing embodiments of the apparatus of the present invention.

BRIEF DESCRIPTION OF THE DRAWINGS

For a more complete understanding of embodiments of the invention, reference is now made to the following Detailed Description of Exemplary Embodiments of the Invention, taken in conjunction with the accompanying drawings, in which.

DETAILED DESCRIPTION OF EXEMPLARY EMBODIMENTS OF THE INVENTION

Figure 1:
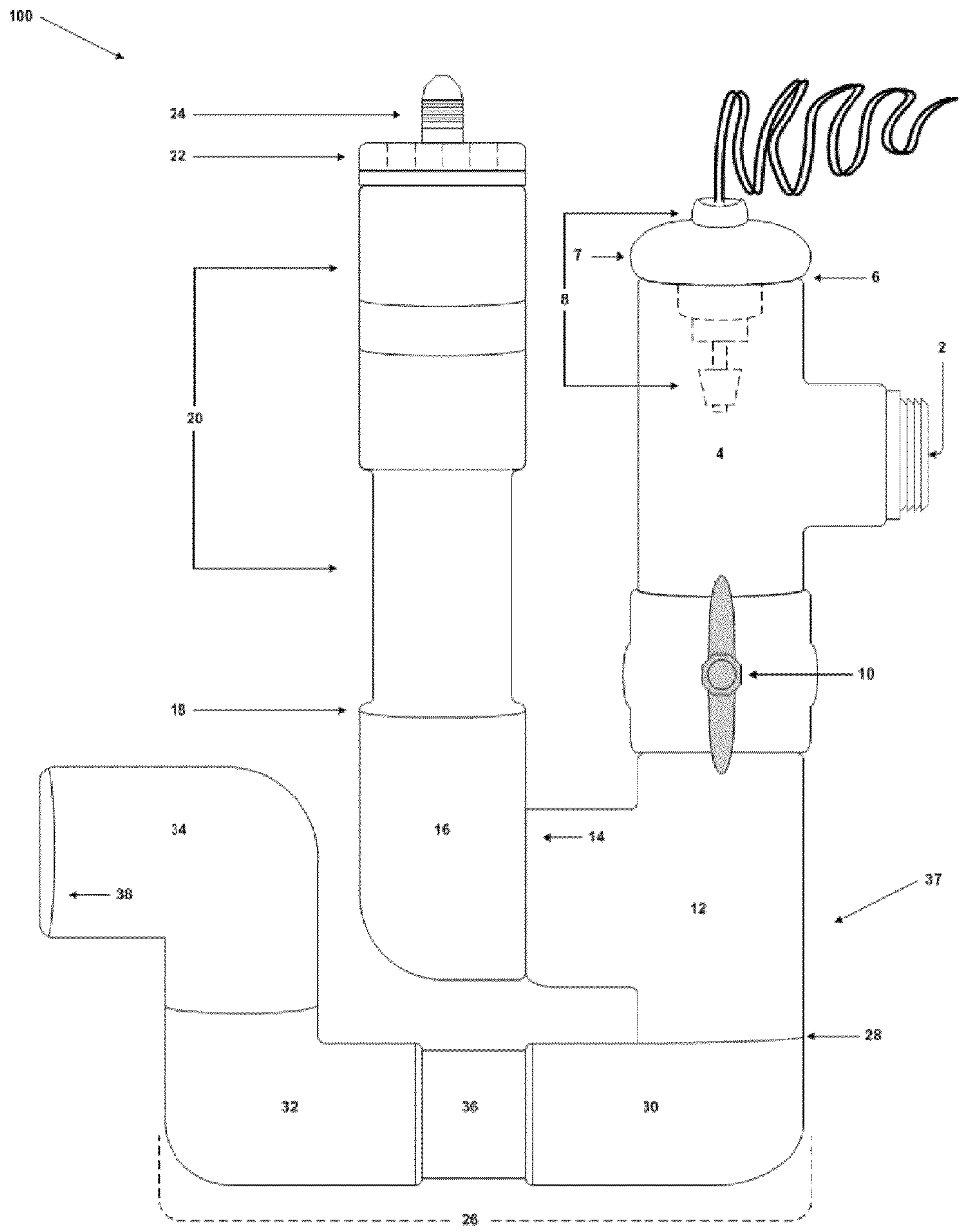
FIG. 1 is a view of an exemplary drainpipe apparatus of the present invention.

Referring to FIG. 1, there is shown an embodiment of a drainpipe apparatus of the present invention. Drainpipe system 100 comprises a source inlet 2. Source inlet 2 is adapted to allow fluid flow into drainpipe system 100 from an external fluid source (not shown in FIG. 1). In one embodiment, the external fluid source comprises an air conditioning system (not shown). Source inlet 2 may be adapted to be connected to the external fluid source by any known or later developed means, such as but not limited to, screwed connection, flanged connection, male/female connection (with or without adhesive), or fusion weld connection. In one embodiment, source inlet 2 comprises a female connection within which a male pipe section (not shown) extending from the external fluid source, to which prior to connection has been applied an adhesive, is inserted.

Source inlet 2 is fluidly connected to inlet tee section 4. In one embodiment, source inlet 2 is fluidly connected to inlet tee section 4 such that fluid flow through source inlet 2 is in a generally horizontal direction. Although FIG. 1 depicts the angle at which source inlet 2 intersects the vertical axis of inlet tee section 4 as approximately 90 degrees, the invention is not so limited and various angles and/or orientations may be employed as would be understood by one skilled in the art. In one embodiment, proximate the top of the vertical portion of inlet tee section 4 is disposed inlet tee opening 6. Opening 6 may comprise a fitting (not shown) adapted to allow fluid connection to a component such as, but not limited to, additional external piping (not shown). Opening 6 may also be adapted to be fitted with a cap or plug 7 which may be utilized to fluidly seal inlet tee section 4 at its top vertical area. In other embodiments (not shown), the component of the invention which inlet tee section 4 constitutes may comprise an elbow or other suitable piping component which performs the fluid flow function of inlet tee section 4 without comprising an opening 6.

In one embodiment, opening 6 and/or cap 7 may be adapted to allow operative connectivity to one or more external devices (not shown). In one embodiment, drainpipe system 100 comprises a liquid level sensing device, such as a float switch, 8. In one embodiment, float switch 8 is disposed at least partially within drainpipe system 100, and may be employed to detect a liquid level within inlet tee section 4. In one aspect, float switch 8 provides an indication that a liquid level 40 (shown in FIG. 2) within drainpipe system 100 may significantly impede fluid flow into drainpipe system 100, and/or may result in reverse flow (i.e., flow of liquid from inlet tee section 4 out of drainpipe system 100 via source inlet 2). In one embodiment, float switch 8 may be adapted so that activation thereof allows for and/or results in informational communication with one or more external devices (not shown). In one aspect, such communication may be utilized in conjunction with one or more controlling means of an external fluid source to control and/or deactivate the external fluid source. In one embodiment, such communication may be utilized to turn off an air conditioning system which comprises the external fluid source. In another embodiment, such communication may be utilized provide an alert to various interested parties that would benefit from prompt knowledge of such float switch 8 activation.

In one embodiment, float switch 8 may comprise any suitable device adapted to sense a liquid level in inlet tee section 4. An exemplary source of such a float switch includes various models of the Safe-T-Switch available from The Rectorseal Corporation of Houston, Tex., or equivalents thereof. In the embodiment depicted in FIG. 2, float switch 8 utilizes a wired connection for power and communication. Additional embodiments are possible, however, wherein float switch 8 may comprise a self-contained power source and/or float switch may utilize a wireless communication mechanism.

In one embodiment, beneath inlet tee section 4 is disposed one or more valves 10. Valve 10 is utilized to fluidly isolate inlet tee section 4, and therefore the external fluid source, from that portion of drainpipe system 100 downstream of inlet tee section 4. Valve 10 may be any type of valve suitable to operate in any specific environment required by whatever liquid and other substances are present in drainpipe system 100. Valve 10 may comprise, but is not limited to, a ball valve, a butterfly valve, a diaphragm valve, a gate valve, or a needle valve. In one embodiment, valve 10 comprises a ball valve. In one embodiment, valve 10 comprises a check valve, also known as a clack valve, non-return valve, or one-way valve, that only allows fluid flow in one direction, i.e., from inlet tee section 4 to an additive introduction tee 12. In the embodiment shown in FIG. 1, valve 10 comprises a manually operated valve, but the invention is not so limited and other types of valves, such as but not limited to, hydraulic, pneumatic, solenoid, motor, and other types of valve actuations may be employed.

In one embodiment, beneath valve 10 is disposed additive introduction tee 12. Additive introduction tee 12 is fluidly connected to inlet tee section 4 whenever valve 10 is not completely closed. In one embodiment, additive introduction tee 12 comprises a portion of a u-bend portion of drainpipe system 100. In one embodiment, additive introduction tee 12 comprises an additive opening 14. In one embodiment, additive opening 14 provides fluid connection between additive introduction tee 12 and an additive reservoir 16. In one embodiment, additive reservoir 16 comprises an elbow component which comprises an additive inlet 18.

Figure 2:
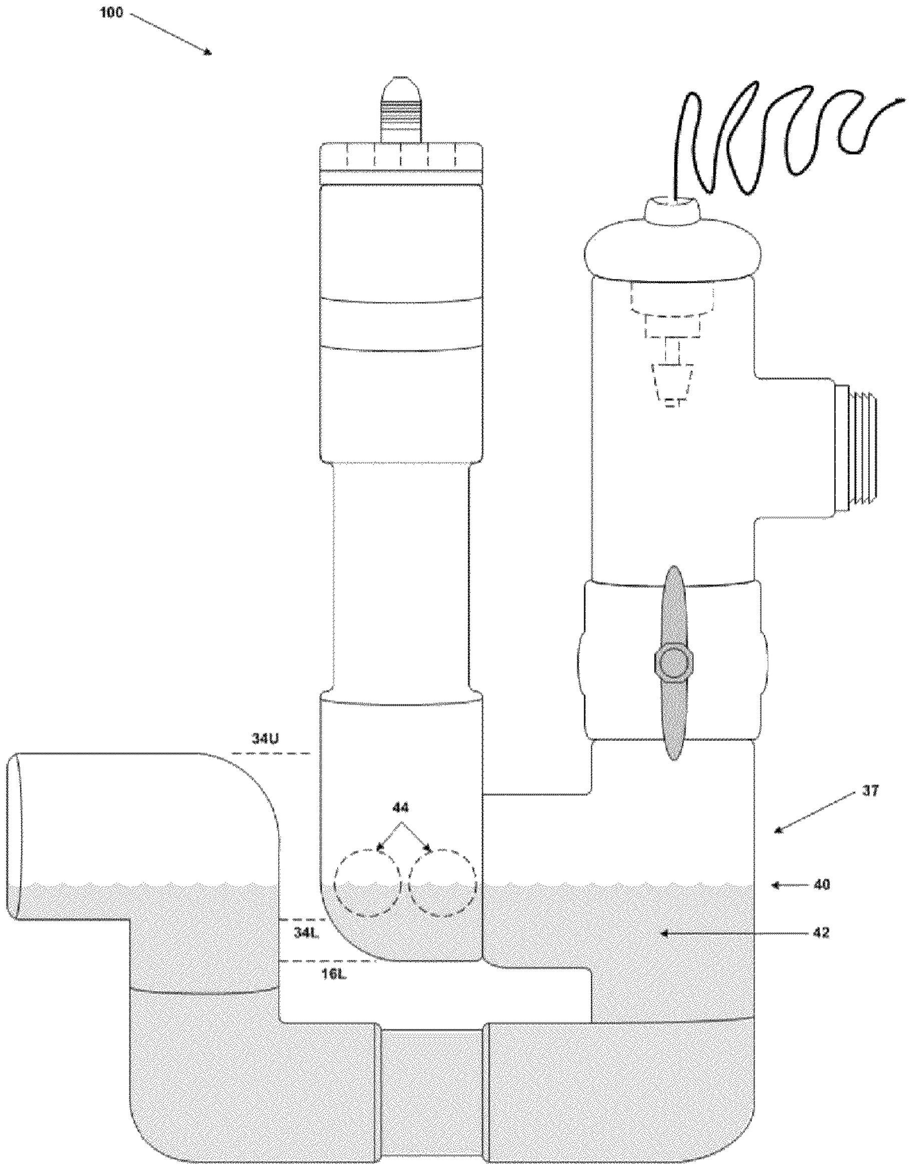
FIG. 2 is a view of an exemplary drainpipe apparatus of the present invention in operation.

Additive reservoir 16 may be employed as a repository for one or more chemical and/or biological additives 44 (shown in FIG. 2). Any additive compatible with the materials of construction of drainpipe system 100 and suitable for a desired chemical and/or biological interaction with the fluids and/or contaminants within drainpipe system 100 may employed. An additive employed in various embodiments may comprise a biocide which comprises one or more chemical substances and/or one or more microorganisms. Examples of such biocides include, but are not limited to, chlorine, sodium dichloro-s-triazinetrione (dihydrate or anhydrous) "dichlor," and trichloro-s-triazinetrione "trichlor." In one embodiment, the chemical additive employed is chlorine. In one embodiment, the chlorine is introduced in tablet form. As would be understood by one skilled in the art, various additives in various forms may be utilized singularly or in combination with embodiments of the present invention.

In one embodiment, disposed above additive inlet 18 is a piping section 20. In one embodiment, piping section 20 comprises a separate piping component fluidly connected to additive inlet 18. In one embodiment, additive inlet 18 comprises piping section 20. Piping section 20 may be employed for various purposes. In one embodiment, piping section 20 extends the reservoir volume of additive reservoir 16. In such an embodiment, additives 44 introduced to additive reservoir 16 may also be at least partially disposed within piping section 20. In the embodiments shown in FIGS. 1-4, piping section 20 is depicted as comprising piping portions having different external diameters, however the invention is not so limited and embodiments of the present invention wherein piping section 20 comprises a single external diameter may be employed.

In one embodiment, an additive dispenser (not shown) may be fixedly or removably disposed within additive reservoir 16 and/or piping section 20. In such an embodiment, one or more additives employed may be introduced to drainpipe system 100 and/or at least partially restrained therein via the additive dispenser. In one embodiment, an additive dispenser comprises a mesh plastic component which is adapted to allow liquids from drainpipe system 100 to contact one or more additives disposed within the additive dispenser. Such contact there between allows for introduction of at least a portion of the additives to fluids contained within drainpipe system 100 via dissolution and/or entrainment of at least a portion of the additives in the liquid. As would be understood by one skilled in the art, an additive dispenser employable with embodiments of the present invention includes any suitable device that provides for at least partial containment of one or more additives there within, and allows for reversible fluid flow between fluids disposed within additive reservoir 16 and/or piping section 20 and the additive dispenser, where such fluid flows allows for contact between the fluid and such additives.

In one embodiment, a removable and sealing cap or plug 22 is provided proximate the top portion of piping section 20. In one embodiment, cap 20 is threadably connected to piping section 20; however, any suitable connection mechanism that allows for cap 22 to removably but sealingly connected to piping section 20 may be employed. In one embodiment, one or more fittings 24 are provided proximate the top of cap 22. In one embodiment, fitting 24 comprises a high-pressure fitting. Cap 22 may comprise a fitting 24, and/or fitting 24 may comprise a separate component adapted to be removably or fixedly attached cap 22. In one embodiment, a cap or plug (not shown) is provided on fitting.

Figure 3A:
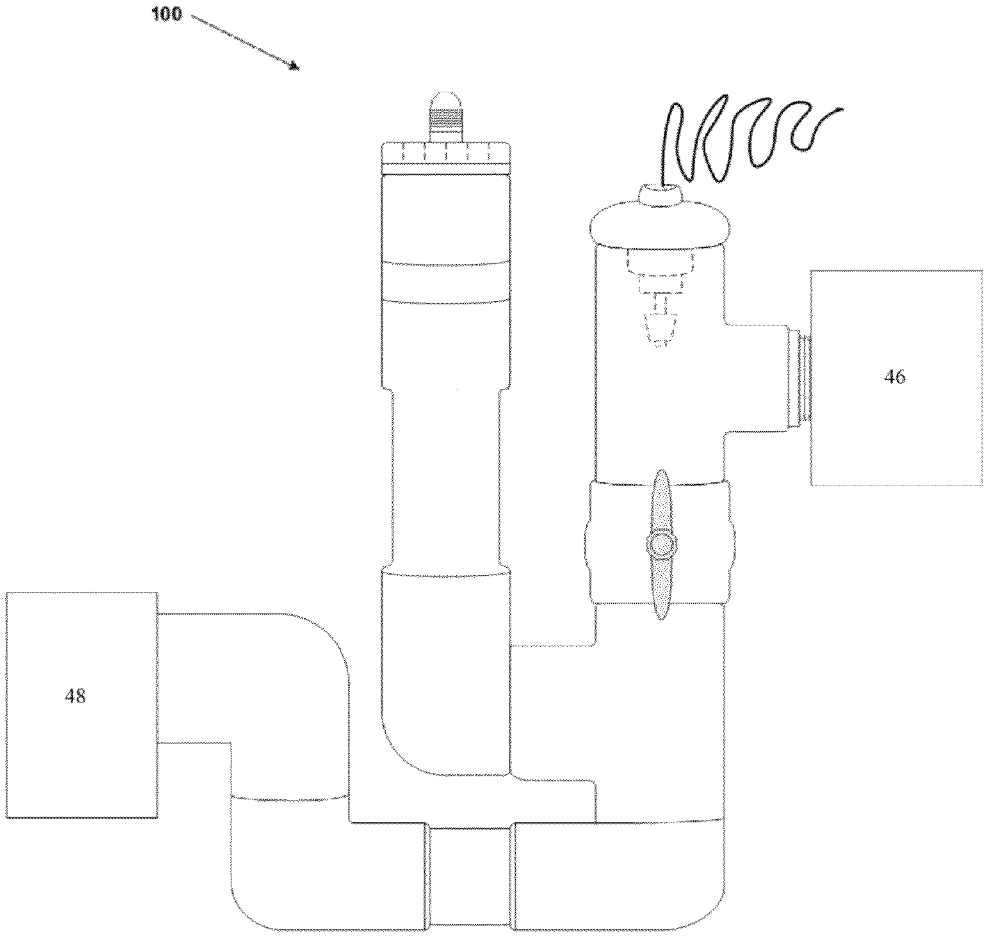
FIG. 3A is a view of an embodiment of the present invention deployed in conjunction with an exemplary external fluid source and exemplary drain.
Figure 3B:
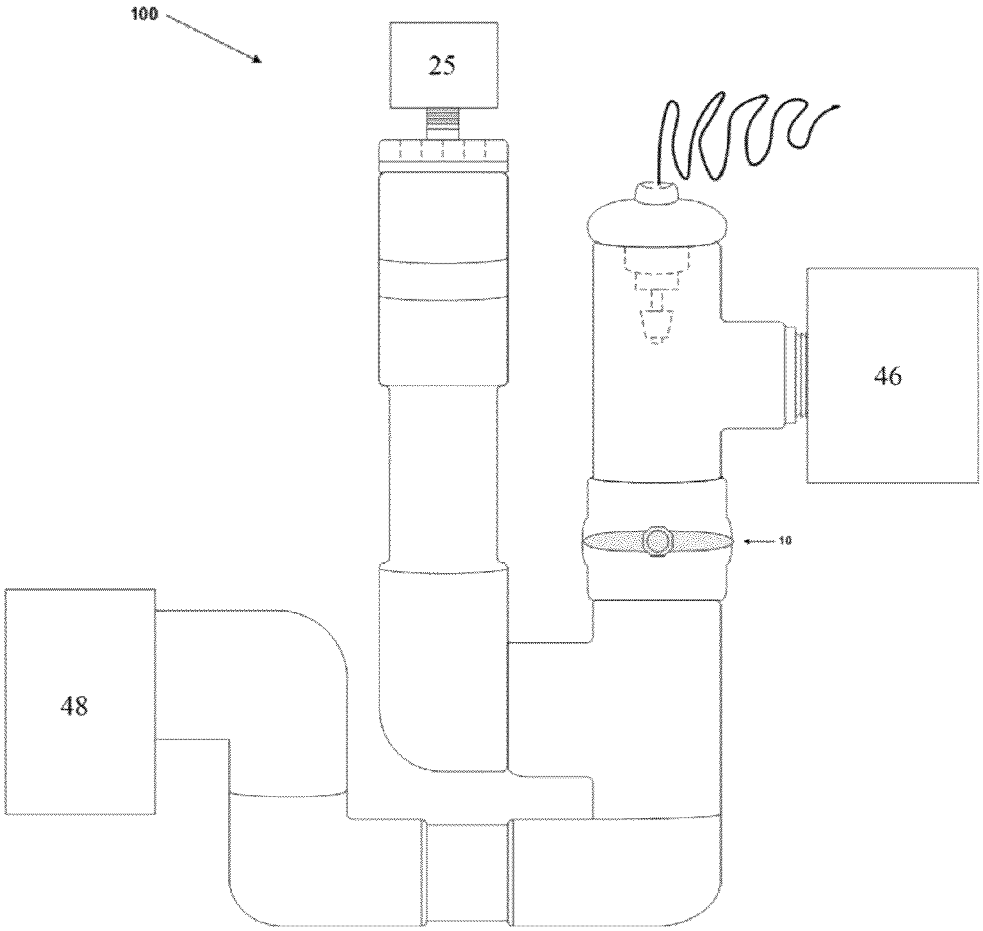
FIG. 3B is a view of an embodiment of the present invention at another stage of deployment in conjunction with an exemplary external fluid source and exemplary drain.

In various embodiments, such as the embodiment shown in FIG. 3B, fitting 24 comprises a connector adaptable to be connected to a fluid source 25. Thereby, a gas source, such as a high-pressure gas source 25, and/or a liquid source, such as a high-pressure liquid source 25, may be introduced to drainpipe system 100. As described herein, “high-pressure” encompasses any pressure level above atmospheric pressure. In other embodiments, cap 22 may comprise a connector adaptable to be connected to a vacuum source (not shown), or cap 22 may be removed to allow connection to a vacuum source (not shown). In such embodiments, a vacuum source (not shown), may be introduced to drainpipe system 100.

In other embodiments (not shown), drainpipe system 100 may be fluidly connectable to fluid source 25 other than through piping section 20. In one such embodiment, fluid source 25 may be fluidly connected via a cap 22 and/or a fitting 24 to an additional fluid conduit (not shown) that is fluidly connected to introduction tee 12.

In one embodiment, fitting 24 comprises or is connected to a valve (not shown) that allows for manipulation, where such manipulation determines whether drainpipe system 100 is fluidly connected or not fluidly connected to any component fluidly connected to fitting 24, and/or the surrounding atmosphere if fitting 24 is fluidly connected thereto. In one embodiment, fitting 24 and/or cap 22 is adapted to be manipulated, where such manipulation determines whether drainpipe system 100 is fluidly connected or not fluidly connected to any component fluidly connected to fitting 24, and/or the surrounding atmosphere if fitting 24 is fluidly connected thereto.

In one embodiment, drainpipe system 100 comprises a piping section 26. Piping section 26 comprises at least a portion of a u-bend component of drainpipe system 100. In one embodiment, piping section 26 is fluidly connected to additive introduction tee 12 via an opening 28. Piping section 26 may comprise a plurality of fluidly connected piping components or piping section 26 may comprise a single component. In one embodiment, piping section 26 comprises elbows 30 and 32, outlet elbow 34, and a connector piping section 36. One skilled in the art would understand that various arrangements of piping and/or piping connector components may be employed to effect the purpose of piping section 26. In one embodiment, a p-trap 37 comprises introduction tee 12 and piping section 26.

In one embodiment, piping section 26 comprises an outlet 38. In one embodiment, outlet 38 is adapted to allow fluid connection of piping section 26, and thereby drainpipe system 100, to an external fluid drain, containment, or collection means (collectively “drain”) 48 (shown in FIGS. 3A and 3B). Outlet 38 may be adapted to be connected to the drain 48 by any known or later developed means, such as but not limited to, screwed connection, flanged connection, male/female connection (with or without adhesive), or fusion weld connection. In one embodiment, outlet 38 comprises a male connection which is inserted into a female pipe section or connector extending from the drain 48, to which prior to connection has been applied an adhesive.

Referring now to FIG. 2, piping section 26 assists in providing liquid level 40 during operation of drainpipe system 100 that allows for contact of the liquid 42 with the one or more additives 44. As would be understood by one skilled in the art, the u-bend configuration generally results in a desired collection of liquid 42 therein at a height level of at least that of a lower interior surface 34L of outlet elbow 34, and no higher than that of an upper interior surface 34U of outlet elbow 34. In the embodiment shown in FIG. 2, at least a portion of a bottom interior surface 16L of additive reservoir 16 is provided at a height below lower interior surface 34L of outlet elbow 34. This facilitates contact between the liquid 42 and additive 44.

Various embodiments of the present invention may comprise any one or more materials suitable for a desired application. Examples of such materials include, but are not limited to, synthetic material such as plastic or polycarbonate; rubber (natural or synthetic); metal; metal alloy; ceramic; graphite; glass; or fiberglass. In one embodiment, at least a portion of drainpipe system 100 comprises poly(vinyl chloride) “PVC.” All or a portion of drainpipe system 100 may comprise anti-microbial materials, including but not limited to, copper and its alloys, silver, other metals or metal alloys, or synthetic materials such as anti-microbial plastic.

As would be understood by one skilled in the art, these and additional embodiments of the drainpipe system of the present invention, or various portions thereof, may comprise individual components cooperatively interconnected or may comprise a single integrated assembly. In addition, references to the horizontal and vertical direction are understood to be exemplary only and the invention is only so limited by gravitational and other forces as would be understood by one skilled in the art. Similarly, the overall and relative dimensions of various embodiments of the invention and portions thereof are only limited by the purpose(s) for which the present invention may be employed.

Method

Referring to FIG. 3A, in an embodiment of a method of the present invention, drainpipe system 100 is provided in fluid connection with an external fluid source 46 and a drain 48. Valve 10 is adjusted to be at least partially open to allow liquid flow between inlet tee section 4 and additive introduction tee 12. As liquid 42 is provided to drainpipe system 100, a liquid level 40 is established. Thereby, liquid 42 comes into contact with additive 44. This contact results in chemical and/or biological exposure of liquid 42 to one or more chemicals and/or microorganisms comprising additive 44, thereby preventing or decreasing formation of living organism contaminants in liquid 42 or on surfaces of drainpipe system 100 in contact therewith. Embodiments of methods of the present invention may be employed when liquid 42 is provided to drainpipe system 100 by external fluid source 46 on a continuous or intermittent basis.

If any portion of drainpipe system 100 becomes plugged by living organism contaminants or otherwise, liquid level 40 may rise. If liquid level 40 rises sufficiently that it comes into contact with float switch 8, information is communicated from float switch 8 to one or more desired locations (not shown). In one embodiment, such communication results in an operational change in external fluid source 46 so that liquid is no longer being provided by external fluid source 46 and/or any liquid provided thereby is directed to an outlet other than drainpipe system 100. This prevents possible adverse effects that may result from a failure of drainpipe system 100 to allow a flow of liquid 42 there through.

If a drainpipe system, such as pipe drain system 100, becomes plugged, such pluggage may be removed using one or more of the following exemplary steps.

Liquid Flow Cessation Step: if flow of a liquid, such as liquid 42, from external fluid source, such as external fluid source 46, to the drainpipe system has not already ceased, shut off such flow.

Valve Closure Step: at least partially close a valve, such as valve 10, to prevent or reduce reverse fluid flow from an additive introduction tee, such as additive introduction tee 12, to an inlet tee section, such as inlet tee section 4. (See FIG. 3B).

Pressurized Fluid Connection Step: connect a pressurized external fluid (liquid and/or gas) source, such as high-pressure fluid source 25, to a fitting, such as fitting 24. (See FIG. 3B).

Pressurized Fluid Clearing Step: provide pressurized external fluid to the drainpipe system.

Pressurized Fluid Disconnection Step: disconnect the pressurized external fluid (liquid and/or gas) source from the fitting.

Valve Opening Step: at least partially open the valve to allow or increase fluid flow between the inlet tee and the additive introduction tee.

Liquid Flow Start Step: resume flow of liquid from the external fluid source to the drainpipe system.

Embodiments of methods of the present invention may comprise some or all of the above listed steps. One or more of such steps may be performed in the order presented or in another order, as would be understood by one skilled in the art. One or more of such steps may be performed once or multiple times, as would be understood by one skilled in the art.

The foregoing description of the invention illustrates various embodiments thereof. The depicted exemplary embodiments may be altered in a number of ways while retaining the inventive aspect, including ways not specifically disclosed herein. Features and characteristics described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/or all of the steps of any method or process so disclosed, may be combined in any combination, except combinations where at least some of such features and/or steps are mutually exclusive. Thus, the method steps have not been provided in any particular sequential order and may be rearranged as needed or desired, with some steps repeated sequentially or at other times, during use.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

I claim:

1. An apparatus for draining liquid, comprising:

a liquid inlet;

a valve;

a p-trap comprising an additive introduction tee and piping;

an additive reservoir; and a p-trap liquid outlet; wherein:

said liquid inlet is fluidly connected to said valve, and is adapted and configured to allow for flow of liquid into said apparatus from an external fluid source;

said valve is adapted and configured to allow and control flow of said liquid between said inlet and said p-trap additive introduction tee;

said p-trap additive introduction tee is oriented so that:

said liquid flowing through said valve is allowed to flow substantially vertically downward into said p-trap additive introduction tee;

said liquid disposed in said p-trap additive introduction tee is allowed to flow substantially vertically downward out of said p-trap additive introduction tee into said piping; and said liquid disposed in said p-trap additive introduction tee is allowed to flow substantially horizontally into said additive reservoir;

wherein said apparatus is adapted and configured to allow at least a portion of said liquid disposed in said p-trap to concurrently accumulate in said additive reservoir;

said additive reservoir is adapted and configured to allow disposition therein of one or more additives; and from a location where said liquid flows from said p-trap additive introduction tee into said piping, said piping extends substantially horizontally to a location where said piping is connected to said p-trap liquid outlet, which is adapted and configured such that a liquid level in said p-trap is disposed above a bottom interior surface of said additive reservoir.

2. The apparatus of claim 1, wherein said apparatus is configured such that said liquid level may be maintained when at least a portion of said liquid is flowing out of said liquid outlet.

3. The apparatus of claim 1, comprising a liquid level sensing device disposed at least partially within said apparatus.

4. The apparatus of claim 3, wherein said liquid level sensing device is adapted and configured to communicate information related to said liquid level.

5. The apparatus of claim 1, wherein said apparatus is configured and adapted to allow for introduction of a high-pressure fluid into said p-trap.

6. The apparatus of claim 5, wherein said apparatus is configured such that said introduction of said high-pressure fluid into said p-trap can occur while fluid communication through said valve is substantially prevented.

7. The apparatus of claim 5, wherein said apparatus comprises a fitting adapted to fluidly connect said apparatus to a high-pressure fluid source.

8. An apparatus for draining liquid, comprising:

a liquid inlet;

a valve;

a p-trap comprising an additive introduction tee and piping;

an additive reservoir;

a p-trap liquid outlet;

a level sensing device; and a high-pressure fitting wherein:

said liquid inlet is fluidly connected to said valve, and is adapted and configured to allow for flow of liquid into said apparatus from an external fluid source;

said valve is adapted and configured to allow and control flow of said liquid between said inlet and said p-trap additive introduction tee;

said p-trap additive introduction tee is oriented so that:

said liquid flowing through said valve is allowed to flow substantially vertically downward into said p-trap additive introduction tee;

said liquid disposed in said p-trap additive introduction tee is allowed to flow substantially vertically downward out of said p-trap additive introduction tee into said piping; and said liquid disposed in said p-trap additive introduction tee is allowed to flow substantially horizontally into said additive reservoir;

wherein said apparatus adapted and configured to allow at least a portion of said liquid disposed in said p-trap to concurrently accumulate in said additive reservoir;

said additive reservoir is adapted and configured to allow disposition therein of one or more additives;

said high-pressure fitting is adapted and configured to provide fluid communication between said apparatus and an external high-pressure fluid source, and is fluidly connected to said additive reservoir;

from a location where said liquid flows from said p-trap additive introduction tee into said piping, said piping extends substantially horizontally to a location where said piping is connected to said p-trap liquid outlet, which is adapted and configured such that a liquid level in said p-trap is disposed above a bottom interior surface of said additive reservoir; and said level sensing device is disposed proximate said liquid inlet, and is adapted and configured to communicate information related to said liquid level.

9. The apparatus of claim 8, wherein said apparatus comprises PVC.

10. The apparatus of claim 8, wherein said level sensing device is a float switch.

11. The apparatus of claim 8, wherein said apparatus comprises a single integrated assembly.

12. The apparatus of claim 8, wherein said additive reservoir contains or comprises an additive dispenser.

13. The apparatus of claim 8, wherein said external high-pressure fluid source comprises a high-pressure gas source.

14. The apparatus of claim 8, wherein said external fluid source comprises an air conditioning device.

15. The apparatus of claim 8, wherein: said liquid inlet is fluidly connected to said valve via an inlet tee section; said level sensing device is at least partially disposed within said inlet tee section; and—said additive reservoir is fluidly connected to said high-pressure fitting.

16. A method for clearing a liquid drain apparatus, comprising:

accessing a liquid drain apparatus comprising:

a liquid inlet;

a valve;

a p-trap trap comprising an additive introduction tee and piping;

an additive reservoir; and a p-trap liquid outlet; wherein:

said liquid inlet is fluidly connected to said valve, and is adapted and configured to allow for flow of liquid into said apparatus from an external fluid source;

said valve is adapted and configured to allow and control flow of said liquid between said inlet and said p-trap additive introduction tee;

said p-trap additive introduction tee is oriented so that:

said liquid flowing through said valve is allowed to flow substantially vertically downward into said p-trap additive introduction tee;

said liquid disposed in said p-trap additive introduction tee is allowed to flow substantially vertically downward out of said p-trap additive introduction tee into said piping; and said liquid disposed in said p-trap additive introduction tee is allowed to flow substantially horizontally into said additive reservoir;

wherein said apparatus adapted and configured to allow at least a portion of said liquid disposed in said p-trap to concurrently accumulate in said additive reservoir;

said additive reservoir is adapted and configured to allow disposition therein of one or more additives; and from a location where said liquid flows from said p-trap additive introduction tee into said piping, said piping extends substantially horizontally to a location where said piping is connected to said p-trap liquid outlet, which is adapted and configured such that a liquid level in said p-trap is disposed above a bottom interior surface of said additive reservoir;

manipulating said valve to substantially block liquid flow out of said liquid drain apparatus via liquid flow through said inlet; and providing pressurized fluid to said liquid drain apparatus.

17. The method of claim 16, wherein said liquid drain apparatus comprises:

a high-pressure fitting; wherein:

said high-pressure fitting is adapted and configured to provide fluid communication between said apparatus and an external high-pressure fluid source, and is fluidly connected to said additive reservoir.

18. The method of claim 17, wherein said liquid drain apparatus comprises:

a level sensing device; wherein:

said level sensing device is disposed proximate said liquid inlet, and is adapted and configured to communicate information related to said liquid level.

19. The method of claim 16, wherein said fluid comprises gas.

20. The method of claim 16, wherein said external fluid source comprises an air conditioning device.

* * * * *

UNITED STATES PATENT AND TRADEMARK OFFICE

CERTIFICATE OF CORRECTION

PATENT NO. : 9,359,750 B1
APPLICATION NO. : 14/804925
DATED : June 7, 2016
INVENTOR(S) : Thomas Perez It is certified that error appears in the above-identified patent and that said Letters Patent is hereby corrected as shown below:

In the Claims

Column 9, line 26, that portion of claim 8 reading "wherein said apparatus adapted and configured" should read --wherein said apparatus is adapted and configured--.

Column 10, line 28, that portion of claim 16 reading "wherein said apparatus adapted and configured" should read --wherein said apparatus is adapted and configured--.

Signed and Sealed this
Ninth Day of August, 2016

Michelle K. Lee

Michelle K. Lee
*Director of the United States Patent and Trademark Office*